(12) United States Patent
Wang

(10) Patent No.: US 11,842,438 B2
(45) Date of Patent: Dec. 12, 2023

(54) METHOD AND TERMINAL DEVICE FOR DETERMINING OCCLUDED AREA OF VIRTUAL OBJECT

(71) Applicant: GUANGDONG OPPO MOBILE TELECOMMUNICATIONS CORP., LTD., Guangdong (CN)

(72) Inventor: Yulu Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 162 days.

(21) Appl. No.: 17/499,856

(22) Filed: Oct. 12, 2021

(65) Prior Publication Data

US 2022/0036648 A1 Feb. 3, 2022

Related U.S. Application Data

(63) Continuation of application No. PCT/CN2020/079282, filed on Mar. 13, 2020.

(30) Foreign Application Priority Data

Apr. 12, 2019 (CN) .......................... 201910295945.3

(51) Int. Cl.
  *G06T 17/00* (2006.01)
  *G06T 7/73* (2017.01)
  *G06F 3/04815* (2022.01)

(52) U.S. Cl.
  CPC .......... *G06T 17/00* (2013.01); *G06F 3/04815* (2013.01); *G06T 7/75* (2017.01)

(58) Field of Classification Search
  CPC ......... G06F 3/011–015; G06F 3/04815; G06T 7/70–77
  See application file for complete search history.

(56) References Cited

U.S. PATENT DOCUMENTS

| 2015/0062120 | A1 | 3/2015 | Reisner-Kollmann et al. |
| 2016/0292867 | A1* | 10/2016 | Martini ..................... G06T 7/55 |
| 2019/0197779 | A1* | 6/2019 | Avramov ................ G06T 11/60 |

FOREIGN PATENT DOCUMENTS

| CN | 102129708 | 7/2011 |
| CN | 102129708 A * | 7/2011 |

(Continued)

OTHER PUBLICATIONS

Jang et al., "Local feature descriptors for 3D object recognition in ubiquitous virtual reality", International Symposium on Ubiquitous Virtual Reality (Year: 2017).*

(Continued)

*Primary Examiner* — Diane M Wills
(74) *Attorney, Agent, or Firm* — Hodgson Russ LLP

(57) ABSTRACT

A method and a terminal device for determining an occluded area of a virtual object, and a computer-readable non-transitory storage medium. The method comprises: constructing a scene three-dimensional map of a current frame according to features points of the current frame and corresponding depth information thereof, and constructing a three-dimensional scene model according to the features points of the current frame; displaying a designated virtual object at a location corresponding to a click operation, in response to detecting the click operation of a user on the scene three-dimensional map; comparing depth values of the three-dimensional scene model with depth values of a model of the virtual object; determining the occluded area of the virtual object in the current frame according to a comparing result; determining another occluded area of the virtual object in a next frame according to the occluded area of the virtual object in the current frame.

16 Claims, 5 Drawing Sheets

(56) References Cited

FOREIGN PATENT DOCUMENTS

| CN | 102509343 | | 6/2014 |
|----|-----------|---|--------|
| CN | 105761245 | | 7/2016 |
| CN | 105761245 A | * | 7/2016 |
| CN | 106803286 | | 6/2017 |
| CN | 106803286 A | * | 6/2017 |
| CN | 107025662 | | 8/2017 |
| CN | 107025662 A | * | 8/2017 |
| CN | 107292965 | | 10/2017 |
| CN | 108038902 | | 5/2018 |
| CN | 108898676 | | 11/2018 |
| CN | 109471521 | | 3/2019 |
| CN | 109471521 A | * | 3/2019 |

OTHER PUBLICATIONS

Lepetit et al., "Handling occlusion in augmented reality systems: a semi-automatic method," International Symposium of Augmented Reality (ISAR 2000), 2000.
EPO, Extended European Search Report for EP Application No. 20787305.0, dated Jun. 20, 2022.
CNIPA, First Office Action for CN Application No. 201910295945. 3, dated Feb. 10, 2023.
Tian et al., "Handling Occlusions in Augmented Reality Based on 3D Reconstruction Method," Neurocomputing, Dec. 2015, pp. 96-104.
Tian et al., "Real-Time Occlusion Handling in Augmented Reality Based on an Object Tracking Approach," Sensors, 2010, vol. 10, pp. 2885-2900.
WIPO, International Search Report for PCT/CN2020/079282, dated May 28, 2020.

\* cited by examiner

METHOD AND TERMINAL DEVICE FOR DETERMINING OCCLUDED AREA OF VIRTUAL OBJECT

CROSS-REFERENCE TO RELATED APPLICATIONS

The present disclosure is a continuation of International Patent Application No. PCT/CN2020/079282, filed on Mar. 13, 2020, which claims priority to Chinese Patent Application No. 201910295945.3, filed on April 12, the entire disclosures of which are incorporated herein by reference.

TECHNICAL FIELD

The present disclosure relates to the field of software technologies, and in particular to a method, a terminal device and a computer-readable non-transitory storage medium for determining an occluded area of a virtual object.

BACKGROUND

Augmented reality (AR) is a new technology that can superimposition a virtual object of system indication information generated by a computer onto a real scene to effectively expand and enhance the reality of the real scene and support a user to interact with the AR.

In the process of using the AR technology, a problem of visual consistency of occlusion is involved. In the visual consistency of occlusion, it is required that the virtual object can occlude a background and also be occluded by a foreground object, with a correct virtual-real occlusion relationship. Only by correctly handling the front-back position relationship of the virtual object in the real world can the user perceive the object's hierarchical relationship between virtual and real objects in a real-time synthetic space. An error in the virtual-real occlusion relationship may cause a spatial location confusion in senses and cannot achieve a sensory experience beyond reality. As the AR research field develops and differentiates, there are currently two main methods in solving the problem of virtual-real visual consistency of occlusion of the AR.

I: A three-dimensional modeling blocking method. The blocking method that is based on model reconstruction includes: pre-modeling a real object that may have an occluding relationship with a virtual object in three dimensions, covering the real object with a three-dimensional model, and then comparing depth values of the virtual-real object models, and according to a comparing result, rendering only a part of the virtual object that is not occluded by the real object, and not rendering a part of the virtual object that is occluded.

II: An occlusion method based on depth calculation. The occlusion method that is based on depth calculation includes the following.

Calculating depth information of a real scene in real time by stereo parallax.

Determining a spatial position relationship between a virtual object and a real scene based on a viewpoint position, an overlapping position of the virtual object, and the acquired depth information of the real scene.

Performing an occlusion rendering correspondingly to realize the virtual-real occlusion.

Since it is required for the first method to reconstruct a three-dimensional model of a real object in advance, a huge amount of work is required. In the second method, since the depth information of the scene needs to be calculated by the stereo parallax, the amount of computation is also large, and the depth value is required to be recalculated as the scene changes.

In summary, it is required for the prior art to use a large amount of computation to determine the occluded part of the virtual object.

SUMMARY OF THE DISCLOSURE

In view of this, embodiments of the present disclosure provide a method, a terminal device and a computer-readable non-transitory storage medium for determining an occluded area of a virtual object to solve problems that it is difficult to quickly determine an occluded area of a virtual object in prior art.

According to a first aspect of the present disclosure, a method for determining the occluded area of the virtual object is provided, comprising: constructing a scene three-dimensional map of a current frame according to features points of a current frame and corresponding depth information thereof, and constructing a three-dimensional scene model according to the features points of the current frame; displaying a designated virtual object at a location corresponding to a click operation, in response to detecting the click operation of a user on the scene three-dimensional map; comparing depth values of the three-dimensional scene model with depth values of a model of the virtual object, and acquiring a comparing result; determining the occluded area of the virtual object in the current frame according to the comparing result; and determining another occluded area of the virtual object in a next frame following the current frame according to the occluded area of the virtual object in the current frame, in response to a pair number of feature points in the next frame, which matches with the feature points of the occluded area of the virtual object in the current frame, being greater than or equal to a preset matching pair threshold.

According to a second aspect of the present disclosure, a terminal device is provided, comprising a memory, a processor and a computer program stored in the memory and executable on the processor, wherein when the processor executes the program, the operations as described in the first aspect are executed.

According to a third aspect of the present disclosure, a computer-readable non-transitory storage medium is provided, the computer-readable non-transitory storage medium stores a computer program, the computer program, when executed by a processor, executes the operations as described in the first aspect.

The benefit of embodiments of the present disclosure comparing with the prior art is as following.

Since a scene three-dimensional map of a current frame is constructed according to feature points of a current frame and corresponding depth information thereof, rather than constructing the scene three-dimensional map of the current frame according to all information of the current frame; thus, an amount of image data is reduced in the construction process, and a speed of constructing the scene three-dimensional map is improved. Furthermore, since a pair number of feature points in the next frame, which matches with the feature points of the occluded area of the virtual object in the current frame, is greater than or equal to a preset matching pair threshold, another occluded area of the virtual object in a next frame following the current frame is determined according to the occluded area of the virtual object in the current frame. Therefore, it is not necessary to refer to all image data of the next frame, the image data involved in the calculation is reduced. Thus, the speed of calculating the occluded area of the virtual object in the next frame is greatly improved.

BRIEF DESCRIPTION OF THE DRAWINGS

In order to more clearly illustrate the technical solutions in the embodiments of the present disclosure, the drawings that need to be used in the embodiments or exemplary technical descriptions are briefly described below.

DETAILED DESCRIPTION

Figure 1:
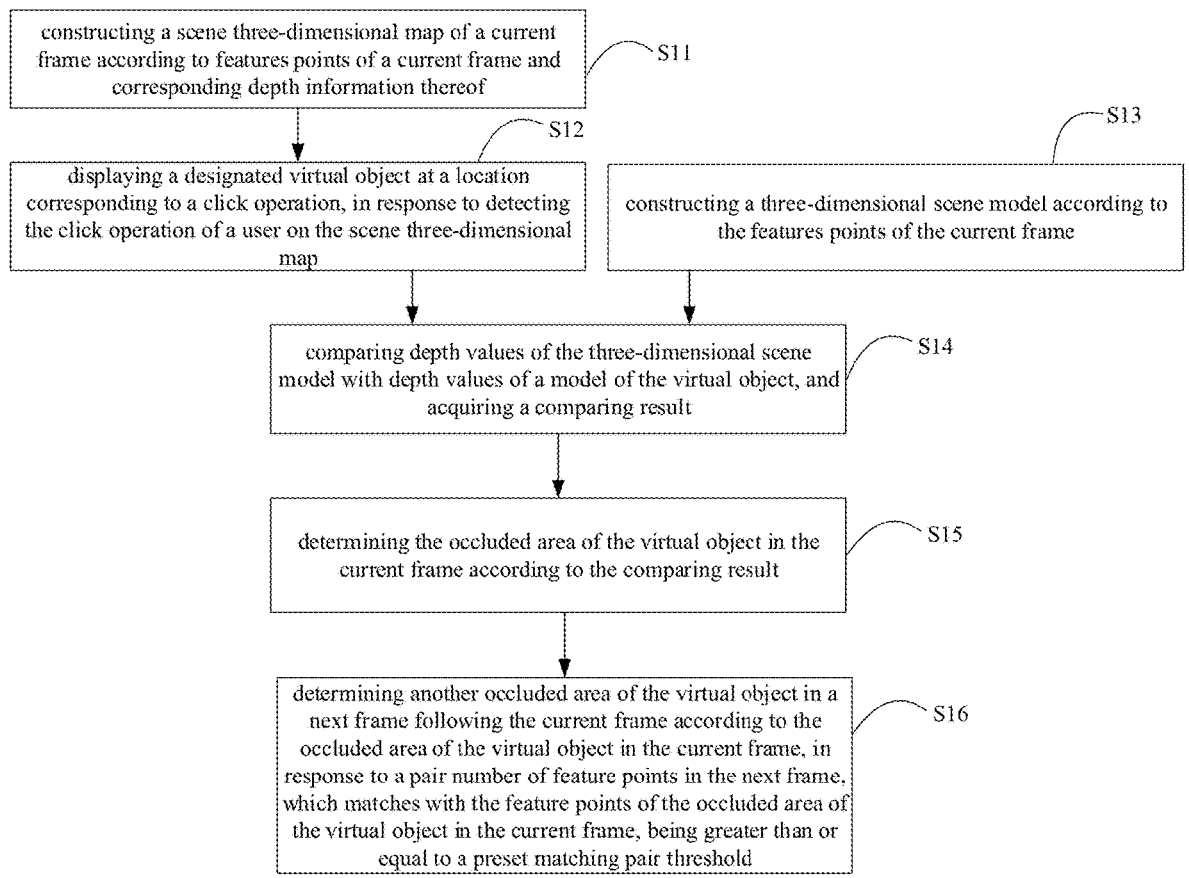
FIG. 1 is a flow chart of a method for determining an occluded area of a virtual object according to an embodiment of the present disclosure.

In the following description, for purpose of explanation and not limitation, specific details are set forth such as specific system structures, techniques, etc., to provide a thorough understanding of the embodiments of the present disclosure. However, it may be apparent to one skilled in the art that the present disclosure may be practiced without these specific details. In other instances, detailed descriptions of well-known systems, apparatuses, circuits, and methods are omitted so as not to obscure the description of the present disclosure with unnecessary detail.

For the purpose of illustrating the technical solutions described herein, the following description is made with specific embodiments.

Understandably, the terms "include" and/or "comprise" when used in this specification and the appended claims, specify the presence of stated features, integers, operations, operations, elements, and/or components, but do not preclude the presence or addition of one or more other features, integers, operations, operations, elements, components, and/or groups thereof.

It may also to be understood that the terminology used herein is for the purpose of describing particular embodiments only and is not intended to be limiting of the present disclosure. As used in this specification and the appended claims, the singular forms "a", "an" and "the" are intended to include the plural forms as well, unless the context clearly indicates otherwise.

It may also be further understood that the term "and/or" as used in this specification and the appended claims, refers to any combination of one or more of the associated listed items, as well as all possible combinations, and includes such combinations.

As used in this specification and the appended claims, the term "if" may be interpreted as "when" or "once" or "in response to determining" or "in response to detecting", depending on the context. Similarly, the phrase "if it is determined" or "if [a stated condition or event] is detected" may be construed in terms of context to mean "upon determining" or "in response to determining" or "upon detecting [the stated condition or event]" or "in response to detecting [the stated condition or event]".

In particular implementations, the terminal device described in the present disclosure includes, but is not limited to, other portable devices such as a mobile phone, a laptop computer, or a tablet computer with a touch-sensitive surface (e.g., a touchscreen display and/or a touchpad). It should also be understood that, in some embodiments, the device described above is not a portable communication device, but rather a desktop computer with a touch-sensitive surface (e.g., a touch screen display and/or a touchpad).

In the following discussion, a terminal device that includes a display and a touch-sensitive surface is described. However, it should be understood that the terminal device may include one or more other physical user-interface devices, such as a physical keyboard, a mouse, and/or a joystick.

The terminal device supports a variety of applications, such as one or more of the following: a drawing application, a presentation application, a word processing application, a website creation application, a disk writing application, a spreadsheet application, a gaming application, a telephone application, a video conferencing application, an e-mail application, an instant messaging application, an exercise support application, a photo management application, a digital camera application, a digital video recorder application, a web browsing application, a digital music player application, and/or a digital video player application.

The various applications that may be executed on the terminal device may be adopted with at least one common physical user-interface device, such as a touch-sensitive surface. One or more functions of the touch-sensitive surface and corresponding information displayed on the terminal may be adjusted and/or changed between applications and/or within a corresponding application. As such, the common physical architecture (e.g., touch sensitive surface) of the terminal may support various applications with user interfaces that are intuitive and transparent to the user.

EMBODIMENTS

FIG. 1 is a flow chart of a method for determining an occluded area of a virtual object according to an embodiment of the present disclosure. The method is applied to a terminal device that arranged with a camera configured to acquire image data and a camera configured to acquire depth information. The camera that acquires depth information may be an RGB camera, and the camera that acquires depth information may be a time-of-flight (TOF) camera. The embodiment will be described in detail below taking the RGB camera and the TOF camera as examples.

In an operation S11, constructing a scene three-dimensional map of a current frame according to features points of a current frame and corresponding depth information thereof.

In the operation, after the current frame of an image is acquired by the RGB camera, the feature points of the current frame area are extracted. A pose of the current frame relative to a reference frame is estimated based on the extracted feature points. Then the position is aligned with a depth map acquired according to the TOF to generate the scene three-dimensional map aligned with the current frame. Before the alignment, the reference frame is selected, and a reference frame coordinate system is established. For example, after the image data of a first frame is captured, the first frame is taken as the reference frame, and correspondingly, a coordinate system established according to the first frame is the reference frame coordinate system; in the following shooting process, image data frames acquired are converted to the reference frame coordinate system. For example, the current frame is converted to a coordinate system of a previous frame, and then the current frame is converted to the reference frame coordinate system according to a rotation relationship between the previous frame and the reference frame. For example, assuming that the first frame is the reference frame and a second frame has been converted to the reference frame coordinate system of the first frame, the corresponding rotation relationship is saved. When the current frame is a third frame, only two conversion steps are needed: converting the third frame to a coordinate system of the second frame, and then converting the third frame to the reference coordinate system of the first frame according to a saved rotation relationship from the second frame to the first frame. Similarly, when the current frame is a fourth frame, the fourth frame is converted to a coordinate system of the third frame, and the fourth frame is converted to the reference coordinate system of the first frame according to a saved rotation relationship from the third frame to the first frame. Certainly, when multiple image data frames are captured before the reference frame coordinate system is established, the first frame is not necessarily selected as the reference frame, but a frame with a greatest parallax to the current frame is selected as the reference frame from the multiple image data frames captured. Certainly, when the current frame is the first frame, the scene three-dimensional map of the first frame is generated according to the position of the feature points of the first frame and the depth information of the feature points of the first frame.

It should be noted that, in an actual application, in order to present a scene three-dimensional map that includes more feature points, the scene three-dimensional maps of multiple sequential frames may be constructed from the feature points of the multiple sequential frames and the corresponding depth information after the multiple sequential frames are acquired.

The depth map includes depth information, such as a depth value, position information, and the like. Further, in order to display more details of the map, the three-dimensional scene map is a dense point cloud map.

The type of the extracted feature points of the current frame may be Oriented FAST and Rotated BRIEF (ORB), the ORB is a fast feature point extraction and description algorithm. Further, the type of the extracted feature points of the current frame may also be Scale Invariant Feature Transform (SIFT), etc. which is not limited herein.

In some embodiments, since the pose is estimated by the extracted feature points, i.e., estimated by software, there may be some error. Therefore, the estimated position may be corrected in conjunction with data acquired in a hardware manner to improve the accuracy of the position resulted. For example, a tightly-coupled non-linear optimization is performed on the extracted feature points in conjunction with data acquired by an Inertial Measurement Unit (IMU) to acquire a modified pose.

In some embodiments, to reduce the amount of computation, the three-dimensional scene map of the current frame is constructed only if the current frame is a key frame.

Specifically, pertaining to comparing the current frame to the previous frame, when the pixel difference (i.e., the parallax) of the current frame and the previous frame is less than or equal to a predetermined threshold, it is determined that the current frame is not the key frame, and the current frame is discarded; when the pixel difference (i.e., the parallax) of the current frame and the previous frame is greater than the predetermined threshold, it is determined that the current frame is the key frame, the feature points of the current frame are extracted, the pose of the current frame relative to the previous frame (i.e. the previous key frame) is estimated according to the feature points of the current frame (i.e. the current key frame), and the pose resulted is corrected and aligned with the depth map, thereby generating the scene three-dimensional map of the current frame (i.e. the current key frame).

In an operation S12, displaying a designated virtual object at a location corresponding to a click operation, in response to detecting the click operation of a user on the scene three-dimensional map.

Specifically, when the constructed scene three-dimensional map is displayed, when the user clicks on a location of the scene three-dimensional map, an anchor coordinate at the location is generated. After the anchor coordinate is generated, it may be observed that the virtual object has a fixed position in the real world, and thus the virtual object will not shift and may fit well in the real world. The virtual object is presented by a predefined model of the virtual object, and the model of the virtual object is a three-dimensional model.

In some embodiments, to make the displayed virtual object more realistic, it is detected whether the position corresponding to the click operation is a plane. When the position corresponding to the click operation is not a plane, the user is notified that the current position is not a plane. Further, when the plane information in the displayed three-dimensional scene map (which may be a plane of a table, etc.) is detected, the user is suggested to perform a click operation on the detected plane to display the virtual object on the plane, thereby making the displayed virtual object more realistic.

In an operation S13, constructing a three-dimensional scene model according to the features points of the current frame.

The feature points includes two-dimensional coordinate information, feature descriptors, and the like.

In the operation, when the scene three-dimensional model is constructed with the feature points that are less than a preset amount threshold, the constructed three-dimensional scene model is sparse, thereby facilitating the reduction of the amount of computation required when constructing the model.

In an operation S14, comparing depth values of the three-dimensional scene model with depth values of a model of the virtual object, and acquiring a comparing result.

Specifically, the depth values of the three-dimensional scene model and the depth values of the model of the virtual object are acquired, respectively. A depth value of the three-dimensional scene model and a depth value of the model of the virtual object on a same perspective are compared.

In an operation S15, determining the occluded area of the virtual object in the current frame according to the comparing result.

Specifically, when the depth values of the virtual object are less than the depth values of the three-dimensional scene model (each of the depth values of the virtual object is compared with a corresponding depth value of the three-dimensional scene model. The corresponding depth value of the three-dimensional scene model is a parameter of a part of the three-dimensional scene model being on a same perspective as a part of the virtual object corresponding to the each depth value of the virtual object), indicating that the virtual object is in front of the three-dimensional scene model, i.e., the virtual object is not occluded; when the depth values of the virtual object are greater than or equal to the depth values of the three-dimensional scene model (specifically, each of the depth values of the virtual object is compared with a corresponding depth value of the three-dimensional scene model. The corresponding depth value of the three-dimensional scene model is a parameter of a part of the three-dimensional scene model being on a same perspective as a part of the virtual object corresponding to the each depth value of the virtual object), indicating that the virtual object is occluded. Further, only the area at which the virtual object is not occluded is rendered, such that areas for rendering are reduced (in number or in size), and the rendering speed is increased.

In an operation S16, determining another occluded area of the virtual object in a next frame following the current frame according to the occluded area of the virtual object in the current frame, in response to a pair number of feature points in the next frame, which matches with the feature points of the occluded area of the virtual object in the current frame, being greater than or equal to a preset matching pair threshold.

Specifically, assuming that 50 feature points are detected in the occluded area of the virtual object in the current frame, then a tracking operation is performed on the 50 feature points in the next frame. When the 50 feature points are all successfully tracked in the next frame, the number of matched pairs is 50. When only 20 feature points are successfully tracked in the next frame, the number of matched pairs is 20.

In the present embodiment, when the pair number is greater than or equal to the preset matching pair threshold, it is indicated that a difference between the next frame and the current frame is small, and the another occluded area of the virtual object in the next frame is determined according to the occluded area of the virtual object in the current frame.

In some embodiments, when the pair number of feature points in the next frame following the current frame, which matches with the feature points of the current frame, is less than the preset matching pair threshold, it is indicated that the difference between the next frame and the current frame is large. In this case, it may be inaccurate to calculate the another occluded area of the virtual object in the next frame according to the occluded area of the virtual object in the current frame. Therefore, to ensure the accuracy of calculation of the another occluded area of the virtual object in the next frame, re-calculation is required according to the comparing result between the depth values of another three-dimensional scene model and the depth values of the virtual object.

Specifically, another three-dimensional scene model is constructed according to the feature points of the next frame; the depth values of the another three-dimensional scene model and the depth values of the model of the virtual object are compared and another comparing result is acquired; and the another occluded area of the virtual object in the next frame is determined according the another comparing result.

In the present embodiment, a scene three-dimensional map of a current frame is constructed according to features points of the current frame and corresponding depth information thereof; a designated virtual object is displayed at a location corresponding to a click operation, in response to detecting the click operation of a user on the scene three-dimensional map; a three-dimensional scene model is constructed according to the features points of the current frame; depth values of the three-dimensional scene model with depth values of a model of the virtual object are compared, and a comparing result is acquired; the occluded area of the virtual object in the current frame is determined according to the comparing result; lastly, the another occluded area of the virtual object is determined according to the occluded area of the virtual object in the current frame. Since the scene three-dimensional map of the current frame is constructed according to the feature points of the current frame and the corresponding depth information thereof, rather than constructing the scene three-dimensional map of the current frame according to all information of the current frame; thus, an amount of image data is reduced in the construction process, and a speed of constructing the scene three-dimensional map is improved. Furthermore, since a pair number of the feature points in the next frame, which matches with the feature points of the occluded area of the virtual object in the current frame, is greater than or equal to the preset matching pair threshold, the another occluded area of the virtual object in the next frame following the current frame is determined according to the occluded area of the virtual object in the current frame. Therefore, it is not necessary to refer to all image data of the next frame, such that the image data involved in the calculation is reduced. In this way, the speed of calculating the occluded area of the virtual object in the next frame is greatly improved.

Figure 2:
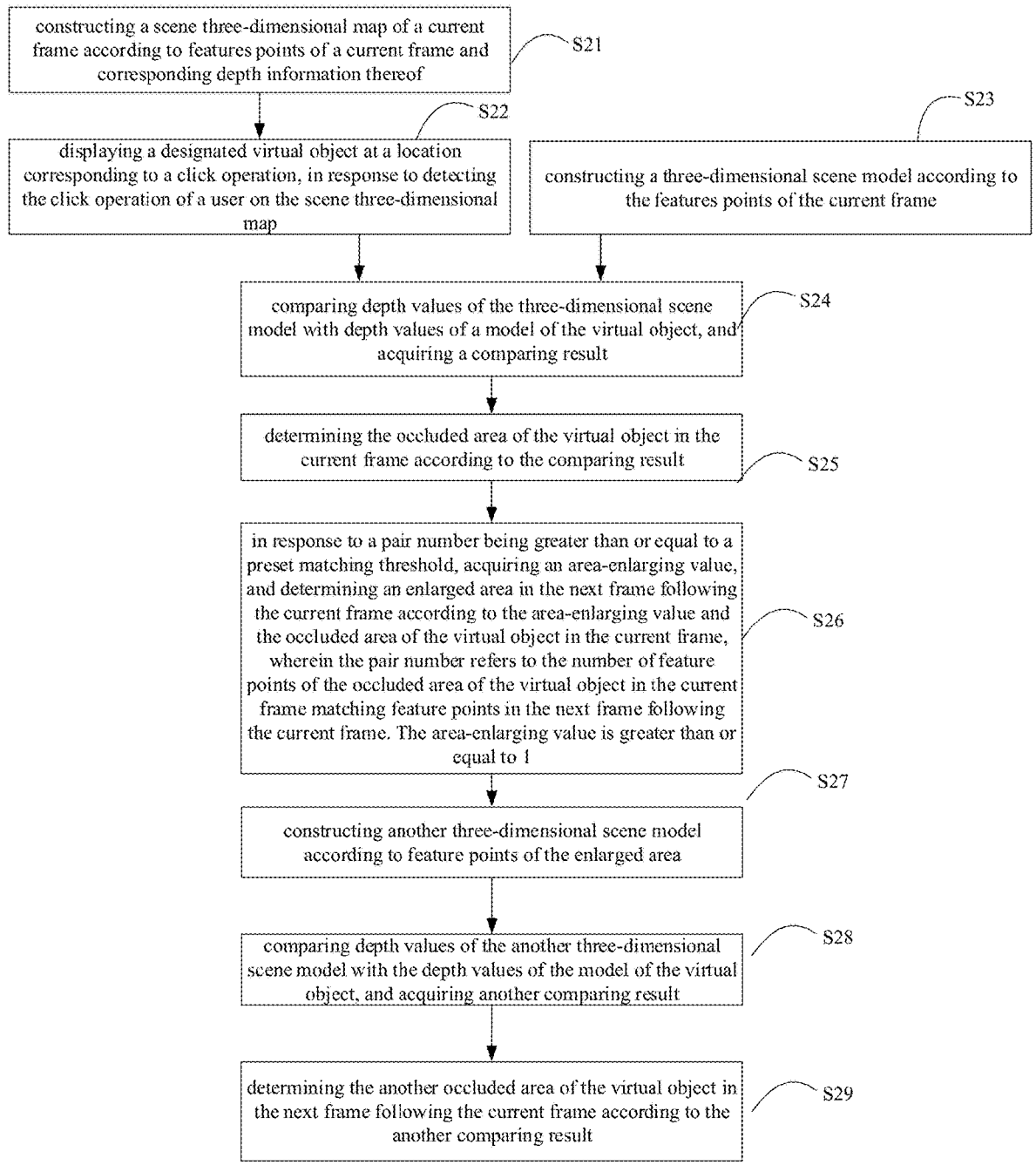
FIG. 2 is a flow chart of a method for determining the occluded area of the virtual object according to another embodiment of the present disclosure.

FIG. 2 is a flow chart of a method for determining the occluded area of the virtual object according to another embodiment of the present disclosure. The operations S21 to S25 are the same as the operations S11 to S15, which will not be repeated herein.

In an operation S21, constructing a scene three-dimensional map of a current frame according to features points of a current frame and corresponding depth information thereof.

In an operation S22, displaying a designated virtual object at a location corresponding to a click operation, in response to detecting the click operation of a user on the scene three-dimensional map.

In an operation S23, constructing a three-dimensional scene model according to the features points of the current frame.

In an operation S24, comparing depth values of the three-dimensional scene model with depth values of a model of the virtual object, and acquiring a comparing result.

In an operation S25, determining the occluded area of the virtual object in the current frame according to the comparing result.

In an operation S26, in response to a pair number being greater than or equal to a preset matching threshold, acquiring an area-enlarging value, and determining an enlarged area in the next frame following the current frame according to the area-enlarging value and the occluded area of the virtual object in the current frame, wherein the pair number refers to the number of feature points of the occluded area of the virtual object in the current frame matching feature points in the next frame following the current frame. The area-enlarging value is greater than or equal to 1.

To acquire a more accurate occluded area, the area-enlarging value is usually set to be greater than 1, and the enlarged area is ensured to be smaller than the whole image area of the next frame.

In the operation, an occluded two-dimensional contour of the virtual object in the current frame is determined according to the occluded area of the virtual object in the current frame; an area corresponding to the two-dimensional contour is located in the next frame following the current frame (which will be referred as the "next frame" in the following specification); the enlarged area is acquired according to the located enlarged area in conjunction with the area-enlarging value.

In an operation S27, constructing another three-dimensional scene model according to feature points of the enlarged area.

In the operation, the feature points are extracted from the enlarged area determined in the next frame; a new coefficient three-dimensional scene model is constructed according to the feature points corresponding to the extracted feature points; the specific constructing process is similar to the operation S13, which will not be repeated herein.

In an operation S28, comparing depth values of the another three-dimensional scene model with the depth values of the model of the virtual object, and acquiring another comparing result.

The specific comparing process of the operation is similar to the operation S14, which will not be repeated herein.

In an operation S29, determining the another occluded area of the virtual object in the next frame following the current frame according to the another comparing result.

In the present embodiment, since the area-enlarging value is greater than or equal to 1, the enlarged area determined in the next frame is greater than or equal to the occluded area of the virtual object in the current frame, thus, all areas that are occluded of the virtual object in the next frame may be determined as many as possible. In addition, the enlarged area is set to be smaller than the whole image area of the next frame to ensure that an amount of image data involved in calculation is less than image data of the whole frame, thereby the amount of calculation is greatly reduced, and a speed for determining the another occluded area of the virtual object in the next frame is improved.

In some embodiments, before the operation S26, the following is included.

Acquiring a rotation angle of a camera from the current frame to the next frame following the current frame, and determining the area-enlarging value according to the rotation angle.

In some embodiments, the acquiring the rotation angle of the camera from the current frame to the next frame following the current frame, and determining the area-enlarging value according to the rotation angle specifically include: acquiring the rotation angle of the camera from the current frame to the next frame following the current frame; projecting the model of the virtual object and the three-dimensional scene model onto a same projection plane according to the rotation angle, to acquire a scene two-dimensional contour corresponding to the three-dimensional scene model and an object two-dimensional contour corresponding to the model of the virtual object; determining an overlapping area of the scene two-dimensional contour and the object two-dimensional contour; and determining the area-enlarging value according to the overlapping area and the occluded area of the virtual object in the current frame.

The rotation angle of an RGB camera from the current frame to the next frame may be acquired by IMU data.

In the present embodiment, a two-dimensional projection area may be determined according to the occluded area of the virtual object in the current frame; a ratio between the overlapping area and the two-dimensional projection area is acquired by comparing the two; the area-enlarging value is determined according to the ratio. For example, a sum of the ratio after rounding up and 1 is taken as the area-enlarging value; certainly, other ways of calculation may be set, which will not be limited herein.

In some embodiments, to improve a speed for determining the area-enlarging value, the following is operated.

In some embodiments, the acquiring the rotation angle of the camera from the current frame to the next frame following the current frame, and determining the area-enlarging value according to the rotation angle specifically include: acquiring the rotation angle of the camera from the current frame to the next frame following the current frame; adding a value to a default area-enlarging value to acquire an added value, and configuring the added value as a final area-enlarging value, in response to the rotation angle being greater than or equal to a preset angle threshold; deducting another value from the default area-enlarging value to acquire a deducted value, and configuring the deducted value as another final area-enlarging value, in response to the rotation angle being less than the preset angle threshold.

In the present embodiment, since the occluded area of the virtual object changes as the camera rotates, an accuracy of the determined area-enlarging value is improved in conjunction with the rotation angle of the camera.

In some embodiments, the operation S13 (or operation S23) is specifically as the following.

A1, three-dimensional coordinates of the feature points of the current frame are determined, according to the feature points of the current frame and a pre-calibrated extrinsic matrix.

The extrinsic matrix refers to a matrix containing position relationship between a RGB camera and a TOF camera.

A2, the three-dimensional scene model is constructed according to the three-dimensional coordinates of the feature points.

In some embodiments, the three-dimensional coordinates are triangulated (e.g., a poisson reconstruction) to construct a sparse three-dimensional scene model of the viewpoint which the current frame illustrates.

In the present embodiment, since the extrinsic matrix is pre-calibrated according to the position relationship between the RGB camera and the TOF camera, after the feature points are acquired, the three-dimensional coordinates may be quickly determined by the extrinsic matrix in conjunction with the feature points, thereby a speed for constructing the three-dimensional scene model is improved.

In some embodiments, to improve an accuracy for constructing the three-dimensional scene model, before the operation S13 (or operation S23), the following is included.

Determining whether the number of the feature points of the current frame is less than a preset feature-point number threshold.

The constructing the three-dimensional scene model according to the three-dimensional coordinates of the feature points includes the following.

Depth information of a depth map of the current frame is acquired, in response to the number of the feature points of the current frame being less than the preset feature-point number threshold. Depth feature-point data from the depth information is extracted. The three-dimensional scene model is constructed according to the three-dimensional coordinates of the feature points and the depth feature-point data.

In the present embodiment, when the number of the feature points of the current frame is less than the preset feature-point number threshold, it is indicated that the current frame includes an area with weak texture information, such as a white wall area. In this case, dense depth information is acquired from the depth map constructed by the TOF camera, then depth feature-point data is extracted from the dense depth information to construct a three-dimensional scene model. The three-dimensional scene model is constructed according to the depth feature-point data and the three-dimensional coordinates of the feature points. Since the three-dimensional scene model is constructed in conjunction with the depth feature-point data under a condition of less extracted feature points, an accuracy for constructing the three-dimensional scene model is improved.

Figure 3:
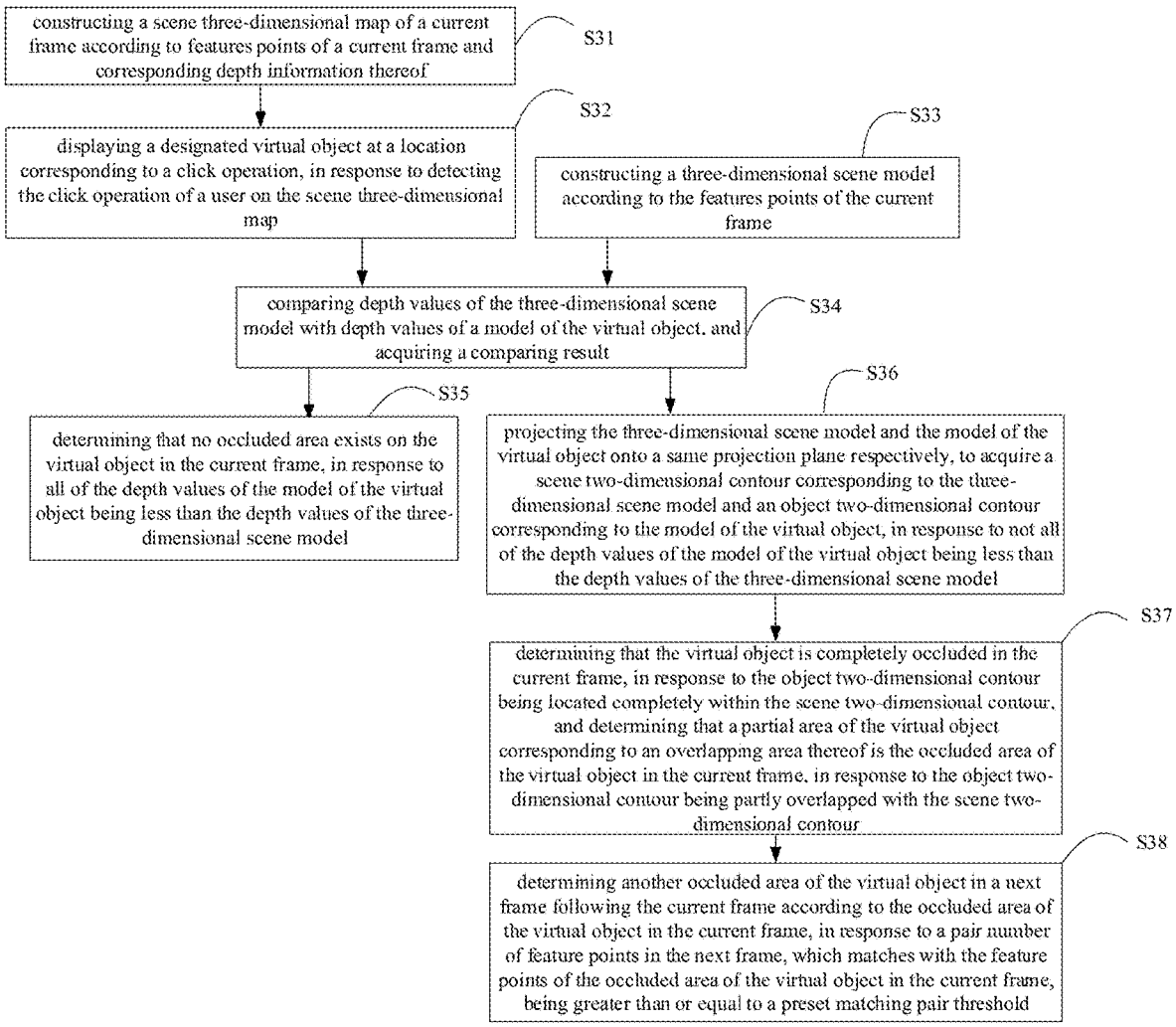
FIG. 3 is a flow chart of a method for determining the occluded area of the virtual object according to further another embodiment of the present disclosure.

FIG. 3 is a flow chart of a method for determining the occluded area of the virtual object according to further another embodiment of the present disclosure, wherein the operations S31 to S34 are the same as the operation S11 to S14 in FIG. 1, which will not be repeated herein.

In an operation S31, constructing a scene three-dimensional map of a current frame according to features points of a current frame and corresponding depth information thereof.

In an operation S32, displaying a designated virtual object at a location corresponding to a click operation, in response to detecting the click operation of a user on the scene three-dimensional map.

In an operation S33, constructing a three-dimensional scene model according to the features points of the current frame.

In an operation S34, comparing depth values of the three-dimensional scene model with depth values of a model of the virtual object, and acquiring a comparing result.

In an operation S35, determining that no occluded area exists on the virtual object in the current frame, in response to all of the depth values of the model of the virtual object being less than the depth values of the three-dimensional scene model.

In an operation S36, projecting the three-dimensional scene model and the model of the virtual object onto a same projection plane respectively, to acquire a scene two-dimensional contour corresponding to the three-dimensional scene model and an object two-dimensional contour corresponding to the model of the virtual object, in response to not all of the depth values of the model of the virtual object being less than the depth values of the three-dimensional scene model.

In an operation S37, determining that the virtual object is completely occluded in the current frame, in response to the object two-dimensional contour being located completely within the scene two-dimensional contour, and determining that a partial area of the virtual object corresponding to an overlapping area thereof is the occluded area of the virtual object in the current frame, in response to the object two-dimensional contour being partly overlapped with the scene two-dimensional contour.

In the operation, the overlapping area (two-dimensional area) is acquired according to the object two-dimensional contour and the scene two-dimensional contour, the partial area (three-dimensional area) corresponding to the overlapping area is searched on the virtual object, and a found area is configured as the occluded area of the virtual object in the current frame.

In the present embodiment, since the occluded area of the virtual object is determined by having the three-dimensional scene model and the model of the virtual object projected onto the same projection plane, respectively; and two-dimensional data is thus acquired, and an amount of calculation by two-dimensional data is less than an amount of calculation by three-dimensional data; thus, the above method may improve a speed for determining the occluded area of the virtual object.

In an operation S38, determining another occluded area of the virtual object in a next frame following the current frame according to the occluded area of the virtual object in the current frame, in response to a pair number of feature points in the next frame, which matches with the feature points of the occluded area of the virtual object in the current frame, being greater than or equal to a preset matching pair threshold.

It should be noted that, the operation S38 may be further refined to be the same as the method in FIG. 2, which will not be repeated herein.

In some embodiments, to determine the projection plane quickly, before the operation S36, the following is included.

The projection plane perpendicular to a connection line is constructed, wherein the connection line is a line connecting a center of the model of the virtual object with a camera viewpoint. Specifically, the viewpoint is a viewpoint of the RGB camera, such as a point corresponding to a coordinate of (0,0) in the RGB camera.

The operation S36 is specifically as the following.

The three-dimensional scene model of the virtual object and the model of the virtual object are projected onto the same projection plane according to an intrinsic matrix of the camera, in response to not all of the depth values of the model of the virtual object being less than the depth value. In this way, the scene two-dimensional contour corresponding to the three-dimensional scene model and the object two-dimensional contour corresponding to the model of the virtual object are acquired.

The intrinsic matrix of the camera is the intrinsic matrix of the RGB camera, the intrinsic matrix includes a focal length, an actual distance of a main point etc.

In the present embodiment, since the intrinsic matrix and the viewpoint of the camera may be determined once the camera is set, the projection plane may be quickly determined without other parameters, thereby a speed for determining the projection plane is improved.

Understandably, values of the serial numbers of the operations in the above embodiments do not imply the order of execution, and the order of execution of each process shall be determined by its function and intrinsic logic, and shall not constitute any limitation to the process of implementation of the embodiments of the present disclosure.

Figure 4:
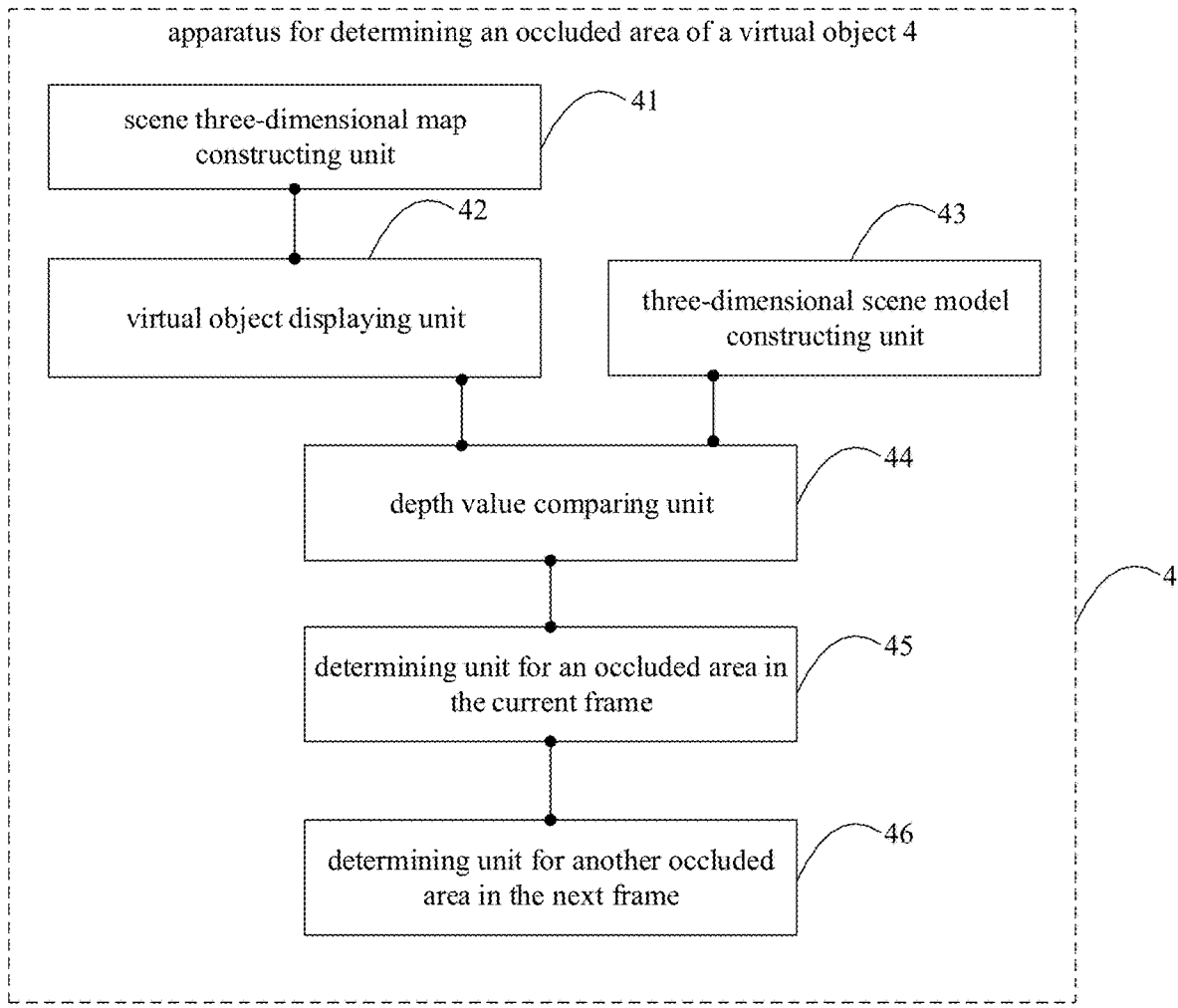
FIG. 4 is a schematic structural diagram of an apparatus for determining an occluded area of a virtual object according to an embodiment of the present disclosure.

FIG. 4 is a schematic structural diagram of an apparatus for determining an occluded area of a virtual object according to an embodiment of the present disclosure. The apparatus for determining the occluded area of the virtual object is applied to a terminal, the terminal is arranged with a camera configured to acquire image data and a camera configured to acquire depth information. The camera that acquires depth information may be an RGB camera, and the camera that acquires depth information may be a time-of-flight (TOF) camera. The embodiment will be described in detail below taking the RGB camera and the TOF camera as examples. For the purpose of illustration, only parts related to the embodiments of the present disclosure are shown.

The apparatus for determining an occluded area of a virtual object 4 includes: a scene three-dimensional map constructing unit 41, a virtual object displaying unit 42, a three-dimensional scene model constructing unit 43, a depth value comparing unit 44, a determining unit for an occluded area in the current frame 45, and a determining unit for another occluded area in the next frame 46.

The scene three-dimensional map constructing unit 41 is configured to construct a scene three-dimensional map of a current frame according to features points of a current frame and corresponding depth information thereof.

Specifically, after the current frame of an image is acquired by the RGB camera, the feature points of the current frame are extracted, and a pose of the current frame relative to a reference frame is estimated based on the extracted feature points, and then the position is aligned with a depth map acquired according to the TOF to generate the three-dimensional scene map aligned with the current frame. Before the alignment, the reference frame is selected, and a reference frame coordinate system is established. For example, after the image data of a first frame is captured, the first frame is taken as the reference frame, and correspondingly, a coordinate system established according to the first frame is the reference frame coordinate system; in the following shooting process, image data frames acquired are converted to the reference frame coordinate system. For example, the current frame is converted to a coordinate system of a previous frame, and then the current frame is converted to the reference frame coordinate system according to a rotation relationship between the previous frame and the reference frame. Certainly, when multiple image data frames are captured before the reference frame coordinate system is established, the first frame is not necessarily selected as the reference frame, but a frame with a greatest parallax to the current frame is selected as the reference frame from the multiple image data frames captured. Certainly, when the current frame is the first frame, the scene three-dimensional map of the first frame is generated according to the position of the feature points of the first frame and the depth information of the feature points of the first frame.

The depth map includes depth information, such as a depth value, position information, and the like. Further, in order to display more details of the map, the three-dimensional scene map is a dense point cloud map.

The type of the extracted feature points of the current frame may be Oriented FAST and Rotated BRIEF (ORB), the ORB is a fast feature point extraction and description algorithm. Further, the type of the extracted feature points of the current frame may also be Scale Invariant Feature Transform (SIFT), etc. which is not limited herein.

In some embodiments, since the pose is estimated by the extracted feature points, i.e., estimated by software, there may be some error. Therefore, the estimated position may be corrected in conjunction with data acquired in a hardware manner to improve the accuracy of the position resulted. For example, a tightly-coupled non-linear optimization is performed on the extracted feature points in conjunction with data acquired by an Inertial Measurement Unit (IMU) to acquire a modified pose.

In some embodiments, to reduce the amount of computation, the three-dimensional scene map of the current frame is constructed only if the current frame is a key frame.

The virtual object displaying unit 42 is configured to display a designated virtual object at a location corresponding to a click operation, in response to detecting the click operation of a user on the scene three-dimensional map.

In some embodiments, to make a displayed virtual object more realistic, the apparatus for determining the occluded area of the virtual object 4 further includes the following.

A plane detection unit is configured to detect whether a location corresponding to a click operation is a plane, when the position corresponding to the click operation is not a plane, a user is notified that the current location is not a plane. Further, when the plane information in the displayed three-dimensional scene map (which may be a plane of a table, etc.) is detected; the user is suggested to perform a click operation on the detected plane to display the virtual object on the plane, thereby making the displayed virtual object more realistic.

The three-dimensional scene model constructing unit 43 is configured to construct a three-dimensional scene model according to the features points of the current frame.

The feature points include two-dimensional coordinate information, feature descriptors, and the like.

The depth value comparing unit 44 is configured to compare depth values of the three-dimensional scene model with depth values of a model of the virtual object, and acquiring a comparing result.

The determining unit for an occluded area in the current frame 45 is configured to determine the occluded area of the virtual object in the current frame according to the comparing result.

The determining unit for another occluded area in the next frame 46 is configured to determine another occluded area of the virtual object in a next frame following the current frame according to the occluded area of the virtual object in the current frame, in response to a pair number of feature points in the next frame, which matches with the feature points of the occluded area of the virtual object in the current frame, being greater than or equal to a preset matching pair threshold.

In some embodiments, to make a displayed virtual object more realistic, the apparatus for determining the occluded area of the virtual object 4 further includes the following.

A determining unit for another occluded area of another scene is configured to construct another three-dimensional scene model according to feature points of the next frame, when a pair number of feature points in the next frame following the current frame, which matches with the feature points of the current frame, is less than a preset matching pair threshold; depth values of the another three-dimensional scene model and the depth values of the model of the virtual object are compared, and another comparing result is acquired; the another occluded area of the virtual object in the next frame is determined according to the another comparing result.

In the present embodiment, since a scene three-dimensional map of a current frame is constructed according to features points of the current frame and corresponding depth information thereof, rather than constructing the scene three-dimensional map of the current frame according to all information of the current frame; thus, an amount of image data is reduced in the construction process, and a speed of constructing the scene three-dimensional map is improved. Furthermore, since a pair number of feature points in the next frame, which matches with the feature points of the occluded area of the virtual object in the current frame, is greater than or equal to a preset matching pair threshold, another occluded area of the virtual object in a next frame following the current frame is determined according to the occluded area of the virtual object in the current frame. Therefore, it is not necessary to refer to all image data of the next frame, such that the image data involved in the calculation is reduced. In this way, the speed of calculating the occluded area of the virtual object in the next frame is greatly improved.

In some embodiments, the determining unit for another occluded area in the next frame 46 further includes the following.

An area-enlarging value acquisition module is configured to acquire an area-enlarging value, and determine an enlarged area in the next frame following the current frame according to the area-enlarging value and the occluded area of the virtual object in the current frame, wherein the area-enlarging value is greater than or equal to 1.

To acquire a more accurate occluded area, the area-enlarging value is usually set to be greater than 1, and the enlarged area is ensured to be smaller than the whole image area of the next frame An another three-dimensional scene model construction module is configured to construct another three-dimensional scene model according to feature points of the enlarged area.

An another three-dimensional scene model depth-comparing module is configured to compare depth values of the another three-dimensional scene model with depth values of the model of the virtual object.

A determination module for another occluded area in the next frame is configured to determine the another occluded area of the virtual object in the next frame following the current frame according to the another comparing result.

In the present embodiment, since an area-enlarging value is greater than or equal to 1, an enlarged area determined in the next frame is greater than or equal to an occluded area of a virtual object in a current frame, thus, all areas that are occluded of the virtual object in the next frame may be determined as many as possible. In addition, the enlarged area is set to be smaller than a whole image area of the next frame to ensure an amount of image data involved in calculation is less than image data of a whole frame, thereby the amount of calculation is greatly reduced, a speed for determining the another occluded area of the virtual object in the next frame is improved.

In some embodiments, the apparatus for determining the occluded area of the virtual object 4 further includes the following.

An area-enlarging value determining unit that is configured to acquire a rotation angle of a camera from the current frame to the next frame following the current frame, and determining the area-enlarging value according to the rotation angle.

In some embodiments, the area-enlarging value determining unit includes: acquiring the rotation angle of the camera from the current frame to the next frame following the current frame; projecting the model of the virtual object and the three-dimensional scene model onto a same projection plane according to the rotation angle, to acquire a scene two-dimensional contour corresponding to the three-dimensional scene model and an object two-dimensional contour corresponding to the model of the virtual object; determining an overlapping area of the scene two-dimensional contour and the object two-dimensional contour; and determining the area-enlarging value according to the overlapping area and the occluded area of the virtual object in the current frame.

The rotation angle of an RGB camera from the current frame to the next frame may be acquired by IMU data.

In the present embodiment, a two-dimensional projection area may be determined according to the occluded area of the virtual object in the current frame; a ratio between the overlapping area and the two-dimensional projection area is acquired by comparing the two; the area-enlarging value is determined according to the ratio. For example, a sum of the ratio after rounding up and 1 is taken as the area-enlarging value; certainly, other ways of calculation may be set, which will not be limited herein.

In some embodiments, the area-enlarging value determining unit includes: acquiring the rotation angle of the camera from the current frame to the next frame following the current frame; adding a value to a default area-enlarging value to acquire an added value, and configuring the added value as a final area-enlarging value, in response to the rotation angle being greater than or equal to a preset angle threshold; deducting another value from the default area-enlarging value to acquire a deducted value, and configuring the deducted value as another final area-enlarging value, in response to the angle being less than the preset rotation angle threshold.

In some embodiments, the three-dimensional scene model constructing unit 43 includes the following.

Three-dimensional coordinates of the feature points of the current frame are determined, according to the feature points of the current frame and a pre-calibrated extrinsic matrix; the three-dimensional scene model is constructed according to the three-dimensional coordinates of the feature points.

In some embodiments, the three-dimensional scene model constructing unit 43 includes the following.

Three-dimensional coordinates of the feature points of the current frame are determined, according to the feature points of the current frame and a pre-calibrated extrinsic matrix.

Determining whether the number of the feature points of the current frame is less than a preset feature-point number threshold.

The three-dimensional scene model is constructed according to the three-dimensional coordinates of the feature points includes the following.

Depth information of a depth map of the current frame is acquired, in response to the number of the feature points of the current frame being less than the preset feature-point number threshold.

Depth feature-point data from the depth information is extracted.

The three-dimensional scene model is constructed according to the three-dimensional coordinates of the feature points and the depth feature-point data.

In the present embodiment, since the three-dimensional scene model is constructed in conjunction with the depth feature-point data under a condition of less extracted feature points, an accuracy for constructing the three-dimensional scene model is improved.

In some embodiments, the determining unit for an occluded area in the current frame 45 includes the following.

A first area determination module is configured to determine that no occluded area exists on the virtual object in the current frame, in response to all of the depth values of the model of the virtual object being less than the depth values of the three-dimensional scene model.

A second area determination module is configured to project the three-dimensional scene model and the model of the virtual object onto a same projection plane respectively, to acquire a scene two-dimensional contour corresponding to the three-dimensional scene model and an object two-dimensional contour corresponding to the model of the virtual object, in response to not all of the depth values of the model of the virtual object being less than the depth values of the three-dimensional scene model.

A third area determination module is configured to determine that the virtual object is completely occluded in the current frame, in response to the object two-dimensional contour being located completely within the scene two-dimensional contour, and determine that a partial area of the virtual object corresponding to an overlapping area thereof is the occluded area of the virtual object in the current frame, in response to the object two-dimensional contour being partly overlapped with the scene two-dimensional contour.

In the present embodiment, since the occluded area of the virtual object is determined by having the three-dimensional scene model and the model of the virtual object projected onto the same projection plane, respectively; and two-dimensional data is thus acquired, and an amount of calculation by two-dimensional data is less than an amount of calculation by three-dimensional data; thus, the above method may improve a speed for determining the occluded area of the virtual object.

In some embodiments, to quickly determine the projection plane, the apparatus for determining the occluded area of the virtual object 4 further includes the following.

A projection plane constructing unit that is configured to construct the projection plane perpendicular to a connection line, wherein the connection line is a line connecting a center of the model of the virtual object with a camera viewpoint.

The second area determination module includes the following.

The three-dimensional scene model and the model of the virtual object are projected onto the same projection plane according to an intrinsic matrix of the camera, in response to not all of the depth values of the model of the virtual object being less than the depth values of the three-dimensional scene model.

The intrinsic matrix of the camera is the intrinsic matrix of the RGB camera, the intrinsic matrix includes a focal length, an actual distance of a main point etc.

In the present embodiment, since the intrinsic matrix and the viewpoint of the camera may be determined once the camera is set, the projection plane may be quickly determined without other parameters, thereby a speed for determining the projection plane is improved.

Figure 5:
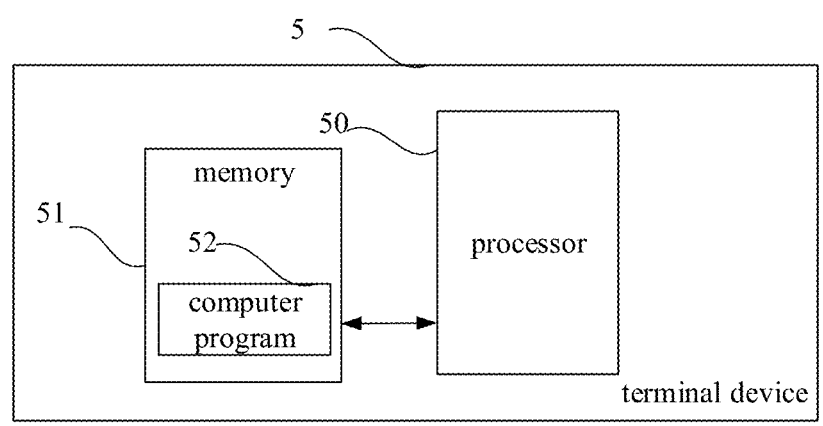
FIG. 5 is schematic diagram of a terminal device according to an embodiment of the present disclosure.

FIG. 5 is schematic diagram of a terminal device according to an embodiment of the present disclosure. As shown in FIG. 5, the terminal device of the embodiment includes: a processor 50, a memory 51 and a computer program 52 stored on the memory 51 and runnable on the processor 50. The processor 50 when executing the computer program 52 implements the operations in each of the above embodiments, such as operations S11 to S16 shown in FIG. 1. Further, the processor 50 is configured to execute the computer program 52 to perform the functions of each module/unit in each of the above embodiments of apparatus/terminal device, such as the functions of modules 41 to 46 shown in FIG. 4.

Exemplarily, the computer program 52 may be divided into one or more modules/units, the one or more modules/units are stored in the memory 51 and executed by the processor 50 to complete the present disclosure. The one or more modules/units may be a series of computer program instruction segments capable of performing a specific function, which instruction segments are used to describe the execution of the computer program 52 in the terminal device 5. For example, the computer program 52 may be divided into a scene three-dimensional map constructing unit, a virtual object displaying unit, a three-dimensional scene model constructing unit, a depth value comparing unit, a determining unit for an occluded area in the current frame, and a determining unit for another occluded area in the next frame, each unit has the following specific functions.

The scene three-dimensional map constructing unit that is configured to construct a scene three-dimensional map of a current frame according to features points of a current frame and corresponding depth information thereof.

The virtual object displaying unit that is configured to display a designated virtual object at a location corresponding to a click operation, in response to detecting the click operation of a user on the scene three-dimensional map.

The three-dimensional scene model constructing unit that is configured to construct a three-dimensional scene model according to the features points of the current frame.

The depth value comparing unit that is configured to compare depth values of the three-dimensional scene model with depth values of a model of the virtual object, and acquiring a comparing result.

The determining unit for an occluded area in the current frame that is configured to determining the occluded area of the virtual object in the current frame according to the comparing result.

The determining unit for another occluded area in the next frame that is configured to determine another occluded area of the virtual object in a next frame following the current frame according to the occluded area of the virtual object in the current frame, in response to a pair number of feature points in the next frame, which matches with the feature points of the occluded area of the virtual object in the current frame, being greater than or equal to a preset matching pair threshold.

The terminal device 5 may be a computing device such as a desktop computer, a laptop, a handheld computer, and a cloud server. The terminal device may include, but not limited to, the processor 50 and the memory 51. It will be understood by those skilled in the art that FIG. 5 is merely an example of terminal device 5 and does not constitute a limitation of terminal device 5, and may include more or fewer components than shown, or a combination of certain components, or different components, for example the terminal device may also include an input device and an output device, a network access device, a bus and the like.

The processor 50 may be a Central Processing Unit (CPU), but also other general-purpose processors, Digital Signal Processor (DSP), Application Specific Integrated Circuit (ASIC), Field-Programmable Gate Array (FPGA) or other programmable logic devices, discrete gate or transistor logic devices, discrete hardware components, Circuit (ASIC), Field-Programmable Gate Array (FPGA) or other programmable logic devices, discrete gate or transistor logic devices, discrete hardware components, etc. The general-purpose processor may be a microprocessor or the processor may be any conventional processor, etc.

The memory 51 may be an internal storage unit of the terminal device 5, such as a hard disk or memory of the terminal device 5. The memory 51 may also be an external storage device of the terminal device 5, such as a plug-in hard disk, a Smart Media Card (SMC), a Secure Digital (SD) card, a Flash Card, etc. equipped on the terminal device 5. Further, the memory 51 may include both internal storage units and external storage devices of the terminal device 5. The memory 51 is configured to store the computer program and other programs and data required by the terminal device. The memory 51 may also be configured to temporarily store data that has been output or will be output.

It will be clear to those skilled in the art that, for the sake of convenience and simplicity of description, only the above-mentioned division of each functional unit and module is used as an example. In practice, the above-mentioned functions may be assigned to different functional units and modules as needed, i.e., the internal structure of the device is divided into different functional units or modules to accomplish all or some of the above-mentioned functions. Each functional unit, module in the embodiment may be integrated in a processing unit, or each unit may physically exist separately, or two or more units may be integrated in a single unit, and the above integrated unit may be implemented either in the form of hardware or software functional units. In addition, the specific names of the functional units and modules are only for the purpose of mutual distinction and are not used to limit the scope of protection of this application. The specific working process of the units and modules in the above system may be referred to the corresponding process in the aforementioned method embodiment, and will not be repeated here.

In the above embodiments, the description of each embodiment has its own focus, and the parts that are not detailed or documented in an embodiment may be found in the relevant descriptions of other embodiments.

Those skilled in the art may realize that the units and algorithmic steps of the various examples described in conjunction with the embodiments disclosed herein are capable of being implemented in electronic hardware, or a combination of computer software and electronic hardware. Whether these functions are performed in hardware or software depends on the particular application and design constraints of the technical solution. The skilled person may use different methods to implement the described functions for each particular application, but such implementations should not be considered outside the scope of this application.

In the embodiments provided in the present disclosure, it should be understood that the disclosed apparatus/terminal device and method, may be implemented in other ways. For example, the embodiments of the apparatus/terminal device described above are merely schematic, for example, the division of the modules or units described, which is only a logical functional division, may be divided in another way when actually implemented, for example multiple units or components may be combined or may be integrated into another system, or some features may be ignored, or not implemented. On another point, the mutual coupling or direct coupling or communication connection shown or discussed may be an indirect coupling or communication connection through some interface, apparatus or unit, which may be electrical, mechanical or other forms.

The units illustrated as separate components may or may not be physically separated, and the components displayed as units may or may not be physical units, i.e., they may be located in one place or may be distributed to a plurality of network units. Some or all of these units may be selected according to practical needs to achieve the purpose of solutions of the embodiments of the present disclosure.

Furthermore, each functional unit in the various embodiments of the present disclosure may be integrated in a single processing unit, or each unit may be physically present separately, or two or more units may be integrated in a single unit. The above integrated units may be implemented either in the form of hardware or in the form of software functional units.

The integrated module/unit, when implemented as a software functional unit and sold or used as a stand-alone product, may be stored in a computer-readable non-transitory storage medium. Based on such understanding, the present disclosure realizes all or part of the processes in the method of the above embodiments, which may also be accomplished by means of a computer program to instruct the relevant hardware; the computer program may be stored in a computer-readable non-transitory storage medium, when executed by a processor, realizes the operations of each of the above method embodiments. Also, the computer program includes computer program code, the computer program code may be in the form of source code, in the form of object code, in the form of an executable file or in some intermediate form, etc. The computer-readable non-transitory medium may include: any entity or device capable of carrying the computer program code, a recording medium, a USB flash drive, a removable hard disk, a diskette, an optical disk, a computer memory, a read-only memory (ROM), a random access memory (RAM), an electrical carrier signal, a telecommunication signals, and software distribution media, etc. It should be noted that the contents contained in the computer-readable non-transitory medium may be added or subtracted as appropriate according to the requirements of legislation and patent practice in the jurisdiction, for example, in some jurisdictions, according to legislation and patent practice, computer-readable non-transitory medium does not include electric carrier signals and telecommunication signals.

The above embodiments are intended only to illustrate the technical solutions of the present disclosure and not to limit them. Despite the detailed description of the present disclosure with reference to the preceding examples, it should be understood by those skilled in the art that it is still possible to modify the technical solutions described in the preceding examples, or to replace some of the technical features with equivalent ones; and these modifications or replacements do not make the essence of the corresponding technical solutions out of the spirit and scope of the technical solutions of the various examples of the present disclosure and they should be included in the scope of protection of the present disclosure.

What is claimed is:

1. A method for determining an occluded area of a virtual object, comprising:
    constructing a scene three-dimensional map of a current frame according to feature points of a current frame and corresponding depth information thereof, and constructing a three-dimensional scene model according to the feature points of the current frame;
    displaying a designated virtual object at a location corresponding to a click operation, in response to detecting the click operation of a user on the scene three-dimensional map;
    comparing depth values of the three-dimensional scene model with depth values of a model of the virtual object, and acquiring a comparing result;
    determining the occluded area of the virtual object in the current frame according to the comparing result; and
    determining another occluded area of the virtual object in a next frame following the current frame according to the occluded area of the virtual object in the current frame, in response to a pair number of feature points in the next frame, which matches with the feature points of the occluded area of the virtual object in the current frame, being greater than or equal to a preset matching pair threshold, comprising:
        acquiring a rotation angle of a camera from the current frame to the next frame following the current frame, and determining an area-enlarging value according to the rotation angle;
        acquiring the area-enlarging value, and determining an enlarged area in the next frame following the current frame according to the area-enlarging value and the occluded area of the virtual object in the current frame, wherein the area-enlarging value is greater than or equal to 1;
        constructing another three-dimensional scene model according to feature points of the enlarged area;
        comparing depth values of the another three-dimensional scene model with the depth values of the model of the virtual object, and acquiring another comparing result; and determining the another occluded area of the virtual object in the next frame following the current frame according to the another comparing result.

2. The method as claimed in claim 1, wherein the constructing a three-dimensional scene model according to the feature points of the current frame comprises:
determining three-dimensional coordinates of the feature points of the current frame, according to the feature points of the current frame and a pre-calibrated extrinsic matrix; and
constructing the three-dimensional scene model according to the three-dimensional coordinates of the feature points.

3. The method as claimed in claim 2, before the constructing the three-dimensional scene model according to the three-dimensional coordinates of the feature points, further comprising:
determining whether the number of the feature points of the current frame is less than a preset feature-point number threshold;
wherein the constructing the three-dimensional scene model according to the three-dimensional coordinates of the feature points comprises:
acquiring depth information of a depth map of the current frame, in response to the number of the feature points of the current frame being less than the preset feature-point number threshold;
extracting depth feature-point data from the depth information; and
constructing the three-dimensional scene model according to the three-dimensional coordinates of the feature points and the depth feature-point data.

4. The method as claimed in claim 1, wherein the determining the occluded area of the virtual object in the current frame according to the comparing result comprises:
determining that no occluded area exists on the virtual object in the current frame, in response to all of the depth values of the model of the virtual object being less than the depth values of the three-dimensional scene model;
projecting the three-dimensional scene model and the model of the virtual object onto a same projection plane respectively, to acquire a scene two-dimensional contour corresponding to the three-dimensional scene model and an object two-dimensional contour corresponding to the model of the virtual object, in response to not all of the depth values of the model of the virtual object being less than the depth values of the three-dimensional scene model; and
determining that the virtual object is completely occluded in the current frame, in response to the object two-dimensional contour being located completely within the scene two-dimensional contour, and determining that a partial area of the virtual object corresponding to an overlapping area thereof is the occluded area of the virtual object in the current frame, in response to the object two-dimensional contour being partly overlapped with the scene two-dimensional contour.

5. The method as claimed in claim 4, before the projecting the three-dimensional scene model and the virtual object model onto the same projection plane, in response to not all of the depth values of the model of the virtual object being less than the depth values of the three-dimensional scene model, further comprising:
constructing the projection plane perpendicular to a connection line, wherein the connection line is a line connecting a center of the model of the virtual object with a camera viewpoint;
wherein the projecting the three-dimensional scene model and the virtual object model onto the same projection plane, in response to not all of the depth values of the model of the virtual object being less than the depth values of the three-dimensional scene model, comprises:
projecting the three-dimensional scene model and the model of the virtual object onto the same projection plane according to an intrinsic matrix of the camera, in response to not all of the depth values of the model of the virtual object being less than the depth values of the three-dimensional scene model.

6. The method as claimed in claim 1, wherein the acquiring a rotation angle of a camera from the current frame to the next frame following the current frame and determining the area-enlarging value according to the rotation angle comprises:
acquiring the rotation angle of the camera from the current frame to the next frame following the current frame; projecting the model of the virtual object and the three-dimensional scene model onto another same projection plane according to the rotation angle, to acquire another scene two-dimensional contour corresponding to the three-dimensional scene model and another object two-dimensional contour corresponding to the model of the virtual object; determining another overlapping area of another scene two-dimensional contour and another object two-dimensional contour; and determining the area-enlarging value according to another overlapping area and the occluded area of the virtual object in the current frame.

7. The method as claimed in claim 1, wherein the acquiring a rotation angle of a camera from the current frame to the next frame following the current frame and determining the area-enlarging value according to the rotation angle comprises:
acquiring the rotation angle of the camera from the current frame to the next frame following the current frame; adding a value to a default area-enlarging value to acquire an added value, and configuring the added value as a final area-enlarging value, in response to the rotation angle being greater or equal to a preset rotation angle threshold; deducting another value from the default area-enlarging value to acquire a deducted value, and configuring the deducted value as another final area-enlarging value, in response to the rotation angle being less than the preset rotation angle threshold.

8. The method as claimed in claim 1, after the in response to detecting the click operation of a user on the scene three-dimensional map, further comprising:
detecting whether the location corresponding to the click operation is a plane;
notifying the user that the location is not a plane, in response to the location being not a plane.

9. The method as claimed in claim 1, before the constructing a scene three-dimensional map of a current frame according to feature points of a current frame and corresponding depth information thereof, comprising:
estimating a pose of a reference frame relative to the current frame by the feature points of the current frame; and aligning the pose with the corresponding depth information, and constructing the scene three-dimensional map aligned with the current frame.

10. The method as claimed in claim 9, before the aligning the pose with the corresponding depth information, comprising:
   selecting the reference frame, wherein the reference frame is a frame that has the greatest parallax with the current frame; and
   establishing a reference coordinate system according to the reference frame.

11. The method as claimed in claim 1, wherein the constructing a scene three-dimensional map of a current frame according to feature points of a current frame and corresponding depth information thereof comprises:
   constructing the scene three-dimensional map, in response to the current frame being a key frame.

12. The method as claimed in claim 11, before the current frame being a key frame, comprising:
   comparing the current frame with a previous frame, and acquiring a pixel difference result;
   determining that the current frame is not the key frame and discarding the current frame, in response to the pixel difference result being less than or equal to a preset threshold; and
   determining that the current frame is the key frame, in response to the difference result being greater than the preset threshold.

13. The method as claimed in claim 1, wherein the displaying a designated virtual object at a location corresponding to a click operation, in response to detecting the click operation of a user on the scene three-dimensional map comprises:
   generating an anchor at the location corresponding to the click operation.

14. A terminal device, comprising a memory, a processor, and a computer program stored in the memory and executable on the processor, wherein the processor is configured to execute the computer program to perform:
   constructing a scene three-dimensional map of a current frame according to feature points of a current frame and corresponding depth information thereof, and constructing a three-dimensional scene model according to the feature points of the current frame;
   displaying a designated virtual object at a location corresponding to a click operation, in response to detecting the click operation of a user on the scene three-dimensional map;
   comparing depth values of the three-dimensional scene model with depth values of a model of the virtual object, and acquiring a comparing result;
   determining an occluded area of the virtual object in the current frame according to the comparing result; and
   determining another occluded area of the virtual object in a next frame following the current frame according to the occluded area of the virtual object in the current frame, in response to a pair number of feature points in the next frame, which matches with the feature points of the occluded area of the virtual object in the current frame, being greater than or equal to a preset matching pair threshold, comprising:
      acquiring a rotation angle of a camera from the current frame to the next frame following the current frame, and determining an area-enlarging value according to the rotation angle;
      acquiring the area-enlarging value, and determining an enlarged area in the next frame following the current frame according to the area-enlarging value and the occluded area of the virtual object in the current frame, wherein the area-enlarging value is greater than or equal to 1;
      constructing another three-dimensional scene model according to feature points of the enlarged area;
      comparing depth values of the another three-dimensional scene model with the depth values of the model of the virtual object, and acquiring another comparing result; and
      determining the another occluded area of the virtual object in the next frame following the current frame according to the another comparing result.

15. The terminal device as claimed in claim 14, wherein the determining the occluded area of the virtual object in the current frame according to the comparing result comprises:
   determining that no occluded area exists on the virtual object in the current frame, in response to all of the depth values of the model of the virtual object being less than the depth values of the three-dimensional scene model;
   projecting the three-dimensional scene model and the model of the virtual object onto a same projection plane respectively, to acquire a scene two-dimensional contour corresponding to the three-dimensional scene model and an object two-dimensional contour corresponding to the model of the virtual object, in response to not all of the depth values of the model of the virtual object being less than the depth values of the three-dimensional scene model; and
   determining that the virtual object is completely occluded in the current frame, in response to the object two-dimensional contour being located completely within the scene two-dimensional contour, and determining that a partial area of the virtual object corresponding to an overlapping area thereof is the occluded area of the virtual object in the current frame, in response to the object two-dimensional contour being partly overlapped with the scene two-dimensional contour.

16. A computer-readable non-transitory storage medium storing a computer program, wherein the computer program when executed by a processor to perform:
   constructing a scene three-dimensional map of a current frame according to feature points of a current frame and corresponding depth information thereof;
   displaying a designated virtual object at a location corresponding to a click operation, in response to detecting the click operation of a user on the scene three-dimensional map;
   constructing a three-dimensional scene model according to the feature points of the current frame;
   comparing depth values of the three-dimensional scene model with depth values of a model of the virtual object, and acquiring a comparing result;
   determining an occluded area of the virtual object in the current frame according to the comparing result; and
   determining another occluded area of the virtual object in a next frame following the current frame according to the occluded area of the virtual object in the current frame, in response to a pair number of feature points in the next frame, which matches with the feature points of the occluded area of the virtual object in the current frame, being greater than or equal to a preset matching pair threshold, comprising:

acquiring a rotation angle of a camera from the current frame to the next frame following the current frame, and determining an area-enlarging value according to the rotation angle;

acquiring the area-enlarging value, and determining an enlarged area in the next frame following the current frame according to the area-enlarging value and the occluded area of the virtual object in the current frame, wherein the area-enlarging value is greater than or equal to 1;

constructing another three-dimensional scene model according to feature points of the enlarged area;

comparing depth values of the another three-dimensional scene model with the depth values of the model of the virtual object, and acquiring another comparing result; and determining the another occluded area of the virtual object in the next frame following the current frame according to the another comparing result.

\* \* \* \* \*